United States Patent
Jung et al.

(10) Patent No.: US 9,258,725 B2
(45) Date of Patent: Feb. 9, 2016

(54) POWER HEADROOM REPORT METHOD AND APPARATUS OF USER EQUIPMENT

(75) Inventors: Jung Soo Jung, Seongnam-si (KR); Gert-Jan Van Lieshout, Middlesex (GB); Soeng Hun Kim, Yongin-si (KR); Kyeong In Jeong, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 918 days.

(21) Appl. No.: 13/353,168

(22) Filed: Jan. 18, 2012

(65) Prior Publication Data
US 2012/0184221 A1    Jul. 19, 2012

(30) Foreign Application Priority Data
Jan. 18, 2011 (KR) ................... 10-2011-0005138

(51) Int. Cl.
*H04W 24/10* (2009.01)
*H04W 52/36* (2009.01)

(52) U.S. Cl.
CPC ............ *H04W 24/10* (2013.01); *H04W 52/365* (2013.01); *Y02B 60/50* (2013.01)

(58) Field of Classification Search
CPC ..... H04W 24/08; H04W 24/10; H04W 24/02; H04W 52/365; H04B 17/318; Y02B 60/50
USPC ...................................................... 455/67.11
See application file for complete search history.

(56) References Cited

U.S. PATENT DOCUMENTS

| | | | | |
|---|---|---|---|---|
| 8,249,091 B2* | 8/2012 | Kim et al. | ...................... | 370/432 |
| 2007/0099647 A1 | 5/2007 | Lee et al. | | |
| 2009/0238136 A1 | 9/2009 | Sambhwani et al. | | |
| 2010/0173665 A1 | 7/2010 | Michel et al. | | |
| 2010/0238863 A1 | 9/2010 | Guo et al. | | |
| 2011/0159912 A1* | 6/2011 | Zong | .............................. | 455/522 |
| 2012/0281568 A1* | 11/2012 | Ho | ...................... | H04W 52/365 370/252 |
| 2013/0012261 A1* | 1/2013 | Zhu | ...................... | H01Q 1/2241 455/550.1 |
| 2013/0114505 A1* | 5/2013 | Haim | ................... | H04W 52/146 370/328 |
| 2013/0176953 A1* | 7/2013 | Stern-Berkowitz | . | H04W 52/146 370/329 |
| 2013/0215849 A1* | 8/2013 | Heo | ..................... | H04W 52/365 370/329 |

OTHER PUBLICATIONS

International Search Report dated Sep. 21, 2012 in connection with International Patent Application No. PCT/KR2012/000419.
Korean Office Action dated Apr. 28, 2015 in connection with Korean Patent Application No. 10-2011-0005138; 11 pages.
3GPP TSG RAN WG2 #72-bis; "PHR Triggering for SAR"; R2-110220; Dublin, Ireland, Jan. 17-21, 2011; 7 pages.
Korean Decision to Grant dated Oct. 22, 2015 in connection with Korean Patent Application No. 10-2011-0005138; 3 pages.
3GPP TSG RAN WG2 #72; SAR Requirement and PHR; Jacksonville, USA, R2-106899; Nov. 15-19, 2010; 2 pages.
3GPP TS 36.321 V10.0.0; "Medium Access Control (MAC) protocol specification"; Release 10; Dec. 2010; 53 pages.

* cited by examiner

*Primary Examiner* — Andrew Wendell
*Assistant Examiner* — Maryam Soltanzadeh

(57) ABSTRACT

A power headroom report method and apparatus of a User Equipment (UE) provides an efficient resource allocation in a mobile communication system. The power headroom report method of the present disclosure includes calculating a power headroom change by comparing the current power headroom and the previous power headroom. The method also includes determining, when the power headroom change is greater than a predetermined threshold value, whether a report prohibit timer set to a predetermined value has expired. The method further includes reporting the current power headroom when the report prohibit timer has expired, and resetting the prohibit timer to a different value.

20 Claims, 11 Drawing Sheets

POWER HEADROOM REPORT METHOD AND APPARATUS OF USER EQUIPMENT

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Jan. 18, 2011 and assigned Serial No. 10-2011-0005138, the contents of which are incorporated herein by reference.

TECHNICAL FIELD OF THE INVENTION

The present disclosure relates to resource allocation in a mobile communication system and, in particular, to a power headroom report method and apparatus of a User Equipment (UE) for efficient resource allocation in the mobile communication system.

BACKGROUND OF THE INVENTION

The present disclosure is directed to a fourth generation mobile communication system supporting ultra-high speed multimedia service evolved from the third generation system characterized by IMT-2000 high speed multimedia service that has been evolved from the first generation analog and second generation digital mobile communication systems in series.

One of the representative second generation mobile communication systems is CDMA 1x system. FIGS. 4 and 5 are graphs illustrating voice activity state variations during human speech. FIG. 4 shows the voice activity variation during the presence of speech, and FIG. 5 shows the voice activity variation during the absence of speech. In FIGS. 4 and 5, the y axis denotes voice activity state, and the voice activity states of CDMA 1x are categorized into full rate, half rate, 1/4 rate, and 1/8 rate. These voice activity states correspond to voice transfer rates of 9.6 kbps, 4.8 kbps, 2.7 kbps, and 1.5 kbps, respectively for transmitting voice data at different transmission power levels. The voice data is transmitted at 3.75 dB for 9.6 kbps transfer rate, −0.25 dB for 4.8 kbps transfer rate, −2.72 dB for 2.7 kbps transfer rate, and −5.875 dB for 1.5 kbps, compared to the uplink pilot channel. As previously mentioned, the transmission power of the uplink voice channel varies quite significantly according to the voice transfer rate in CDMA 1x system. If the voice transfer rate changes from the full rate to 1/8 rate, the transmission power decreases over 9-fold (9.625 dB). Such a significant change of voice transfer rate takes place frequently during the voice call session, especially in the speech section (see FIG. 4) rather than in the non-speech section (see FIG. 5). In FIG. 4, the abrupt change of voice transfer rate in the speech section is marked with circles. The change of voice transfer rate in the non-speech section takes place less abruptly and less frequently as shown in FIG. 5.

Among the third generation mobile communication systems, CDMA HRPD (High Rate Packet Data) and WCDMA HSPA (High Speed Packet Data) systems are representative examples of mobile communication systems having the channel structure for high speed data transmission. The CDMA HRPD system is a system based on Code Division Multiple Access (CDMA), and the typical structure of HRPD system includes a Packet Data Service Node (PDSN) 101 connected to the Internet and transmitting high speed packet data to a base station 103 and a Packet Control Function (PCF) 102 for controlling the base station 103, as shown in FIG. 1. The base station 103 performs radio communication with a plurality of mobile stations 104 and transmits high speed packet data to the mobile station having the highest data rate.

The fourth generation mobile communication system evolved from the third generation mobile communication system, such as a HRPD system, aims at a data rate of 20 Mbps or higher for ultra high-speed multimedia service and adopts an orthogonal frequency transmission scheme such as Orthogonal Frequency Division Multiplexing (OFDM). The Long Term Evolution (LTE) and LTE-Advanced (LTE-A) of the 3GPP standard are representative fourth generation mobile communication systems. Referring to FIG. 2, the LTE system includes evolved Node B (eNB) 202 performing radio communications with a plurality of User Equipment (UEs) 201 to provide high speed multimedia service, Mobility Management Entity/Serving Gateway (MME/S-GW) 203 for managing UE mobility, call processing, and data transfer path, and Packet Data Network Gateway (P-GW) 204 connected to the Internet to deliver the high speed packet data to the UE via the eNB.

In a system where the reverse (or downlink) resource is allocated to the UEs based on the eNB scheduling, the eNB should know the information regarding the power headroom of each UE for efficient scheduling. If the eNB has no information regarding the power headroom of the UE, the UE may be allocated a resource larger than the data amount to be transmitted in unit time duration based on the current power headroom, resulting in unnecessary waste of reverse (or uplink) resources. The LTE standard also specifies the power headroom report procedure. In LTE, the power headroom report is triggered when the downlink path-loss measured by the UE is greater than a predetermined threshold value.

However, the conventional power headroom report has a drawback in that the UE reports power headroom too many times in a short duration when the UE is moving at high speed or the radio channel of the UE varies frequently due to the ambient environment.

SUMMARY OF THE INVENTION

To address the above-discussed deficiencies of the prior art, it is a primary object to provide an enhanced power headroom report method that is capable of overcoming power control problem caused when a UE uses multiple different generation communication technologies.

A radio communication technology-enabled terminal is restricted in maximum transmission power by government regulation. For example, the terminal operating on a licensed band is often limited to a transmission power of 200 mW, and the transmission power limit can be changed according to the country regulation. Such a transmission power regulation is applied equally to all communication terminals including the terminal operating with multiple different radio communication technologies. Assuming a terminal using LTE and second generation CDMA 1x communication technologies, the sum of the transmission powers for both communication technologies is also limited to 200 mW. The peak transmission power of the terminal also can be limited by hardware restriction.

FIG. 3 is a diagram illustrating power distribution for multiple communication technologies enabled in a terminal. Reference number 401 denotes the maximum transmission power (maximum allowed transmission power or peak transmission power restricted by hardware) of the terminal. If the terminal operates with LTE radio communication technology and CDMA 1x radio communication technology, the maximum allowed transmission power 401 is divided into maximum LTE allowed power 402 and maximum 1xRTT transmission power 403.

In a situation where the terminal operates with multiple radio communication technologies as shown in FIG. 3, the transmission power allocated for one radio communication technology is restricted by the transmission power allocated for the other radio communication technology. This is true even when the terminal uses both cellular (such as CDMA 1x, GSM, HRPD, and LTE) and non-cellular (such as Wireless Local Area Network (WLAN) and Bluetooth) communication technologies. In a situation where multiple radio communication technologies are enabled, the technology responsible for high priority communication is allocated its power first and then the other technology responsible for low priority communication is allocated its power from the remaining power. Assuming a terminal supporting voice communication with CDMA 1x radio technology and data communication with LTE radio technology, the terminal can restrict the transmission power (i.e. data rate) for LTE data communication in order to ensure the quality of voice communication in a given power range.

Since the transmission power for use in voice communication of CDMA 1x system is likely to vary frequently as described with reference to FIGS. 4 and 5, this results in the frequent variation of the power headroom for use in data communication. The variation of power headroom should be reported for the UE to perform scheduling efficiently. However, if the LTE power headroom report is triggered whenever the CDMA 1x transmission power changes, the frequent power headroom report is likely to cause system overload.

The present disclosure proposes a power headroom report method of a multiple radio communication technology-enabled terminal that is capable of reporting per-technology power headroom efficiently.

Also, the present disclosure proposes a power headroom report method that is capable of improving power headroom reporting accuracy by applying different power headroom report schemes depending on whether the power headroom of a target system increases or decreases.

Also, the present disclosure proposes a power headroom report method that is capable of reducing unnecessarily frequent power headroom reports by introducing different power headroom report prohibit timers for an increase or decrease of power headroom.

In accordance with an aspect of the present disclosure, a method for reporting power headroom of a terminal supporting multiple radio communication systems includes measuring current power headroom for one of the multiple radio communication systems. The method also includes detecting a power headroom change by comparing the current power headroom and a previously measured power headroom. The method further includes determining whether to report the current power headroom according to a time duration of the power headroom change.

In accordance with another aspect of the present disclosure, a method for reporting power headroom of a terminal includes calculating, when a report prohibit timer set to a predetermined value has expired, a power headroom change by comparing the current power headroom and a previously measured power headroom, and reporting, when the power headroom change is equal to or less than a predetermined threshold value, the current power headroom.

In accordance with another aspect of the present disclosure, an apparatus for reporting power headroom of a terminal supporting multiple radio communication systems includes a calculation unit configured to calculate a power headroom change between a current power headroom and a previously measured power headroom. The system also includes a determination unit configured to determine, when the power headroom change is greater than a predetermined threshold value, whether a report prohibit timer set to a predetermined value has expired. The system further includes a controller configured to control, when the report prohibit timer has expired, to report the current power headroom to the corresponding system and reset the report prohibit timer to a different value.

In accordance with still another aspect of the present disclosure, an apparatus for reporting power headroom of a terminal supporting multiple radio communication systems includes a determination unit configured to determine whether a report prohibit timer set to a predetermined value has expired. The apparatus also includes a controller configured to control to report, when the report prohibit timer has expired. The apparatus further includes a calculation unit configured to calculate a power headroom change between a current power headroom and a previously measured power headroom. The apparatus still further includes a controller configured to control, when the report prohibit timer has expired, to report the current power headroom to the corresponding system.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 6 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communication system. Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure. Further, the following terms are defined in consideration of the functionality in the present disclosure, and may vary according to the intention of a user or an operator, usage, and so forth. Therefore, the definition should be made on the basis of the overall content of the present specification.

The present disclosure describes a power headroom report method for controlling power headroom report in adaptation to increase and decrease of the power headroom of the target system. Also, the present disclosure describes a power headroom report method that is capable of processing decreased power headroom report more preferentially than increased power headroom report.

The present disclosure describes a method for setting the power headroom report prohibit timer to different values for the situations associated with an increase or decrease of the power headroom. Also, the present disclosure describes a power headroom method for restricting the power headroom report for situations associated with an increase of power headroom by running a long power headroom report prohibit timer as compared to those for a decrease and increase of the power headroom. Also, the present disclosure describes a method for resetting the power headroom report prohibit time after completion of a power headroom report regardless of the currently running power headroom report prohibit timer when the power headroom decreases. Furthermore, the present disclosure describes a method for performing a power headroom report only when the power headroom increases over a predetermined time duration when the power headroom increases abruptly.

Figure 1:
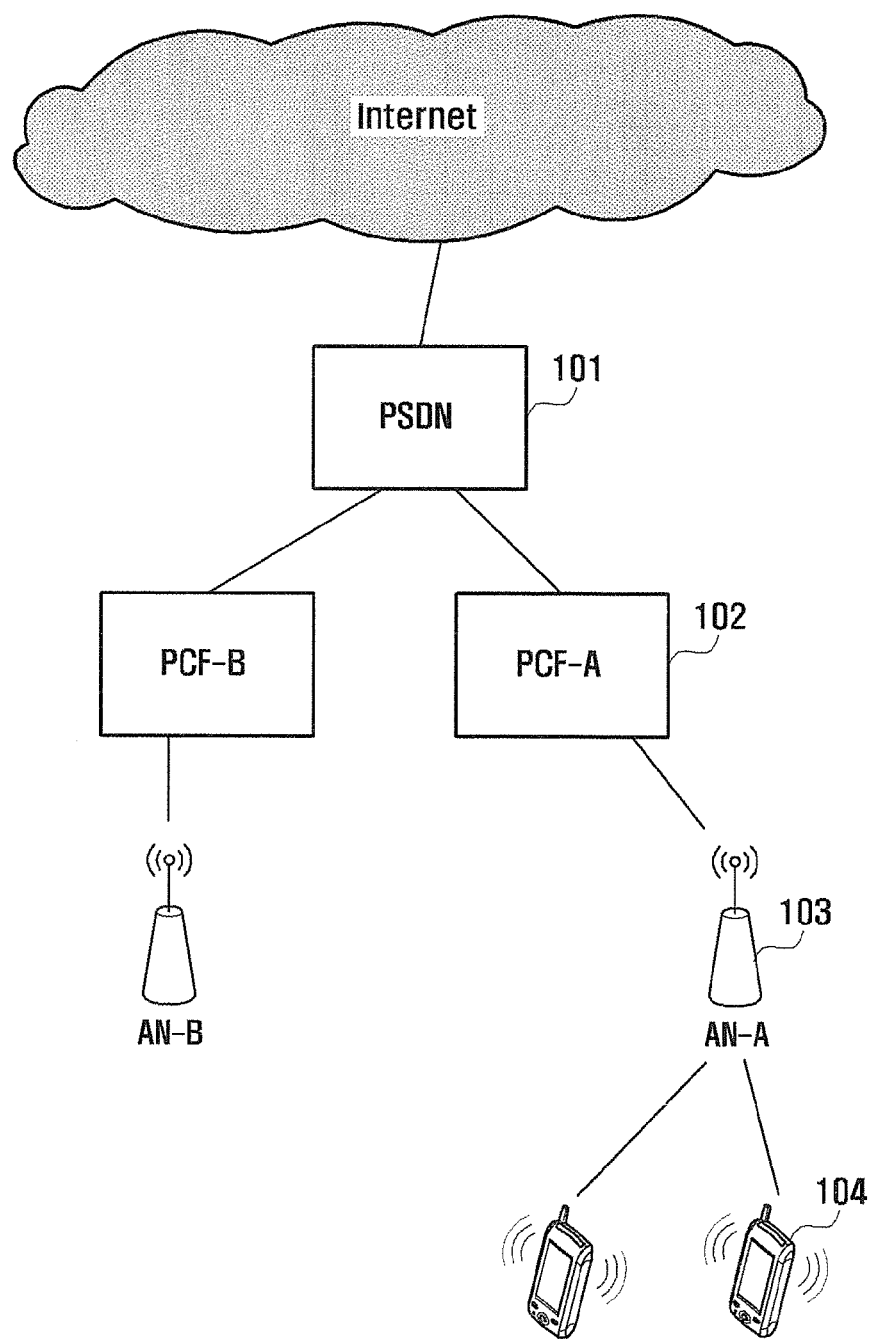
FIG. 1 illustrates an architecture of the conventional CDMA HRPD system.
Figure 2:
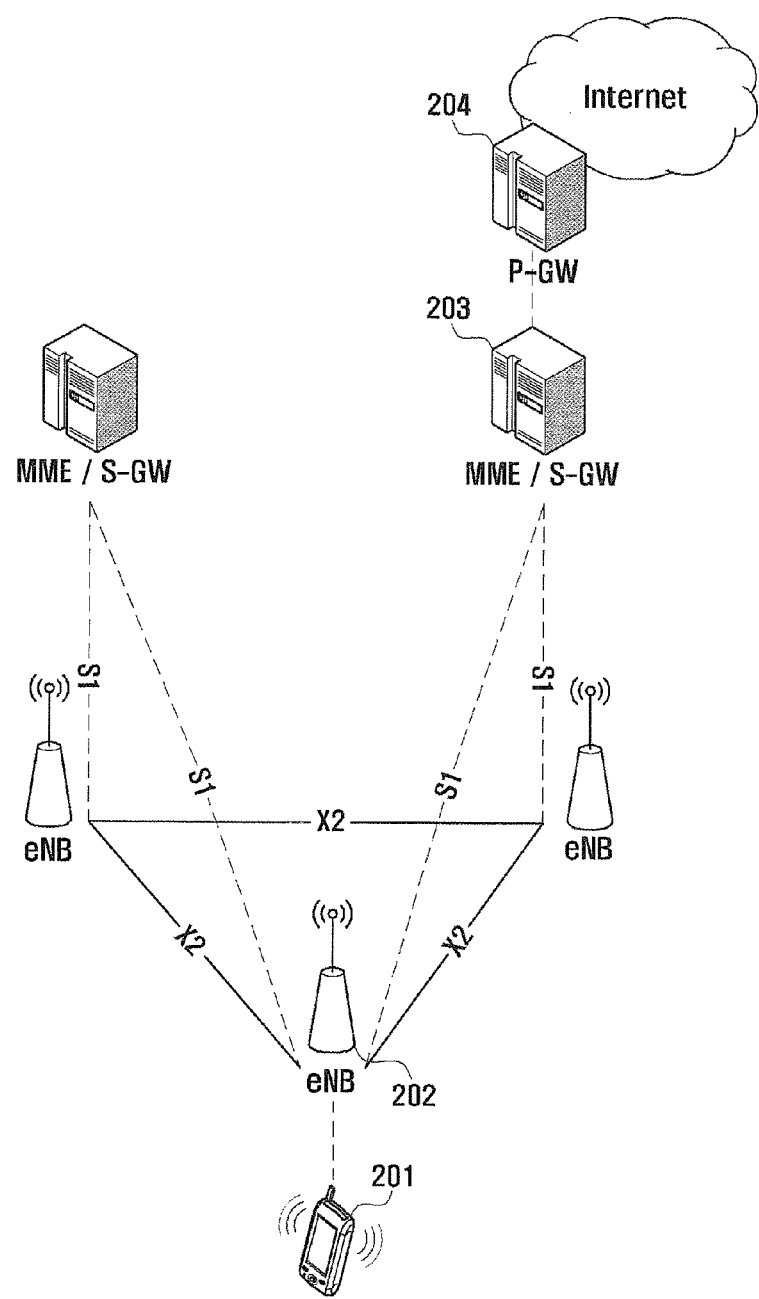
FIG. 2 illustrates an architecture of a conventional LTE system.
Figure 3:
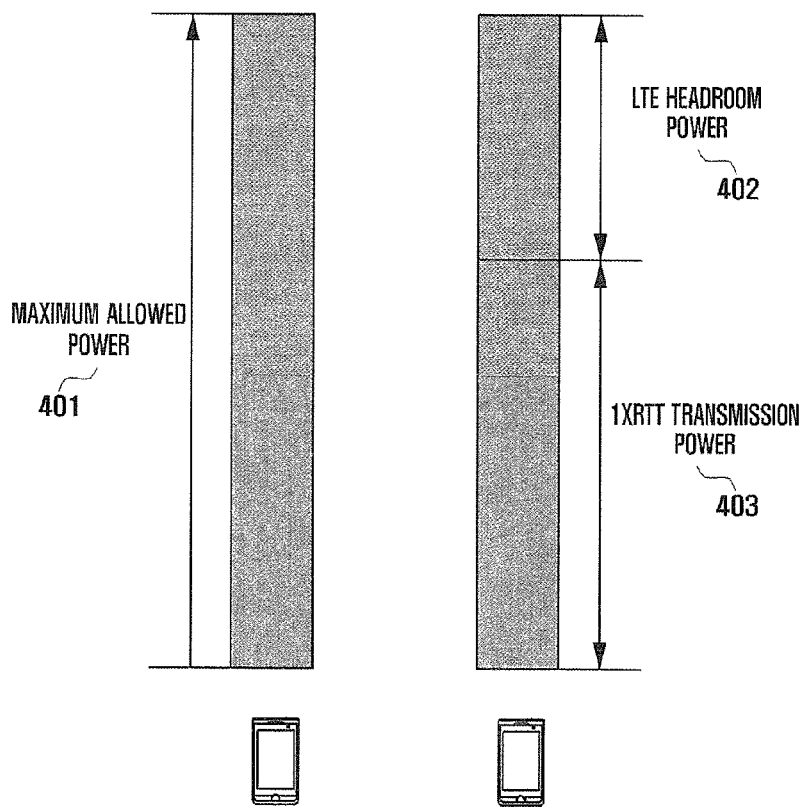
FIG. 3 illustrates power distribution for multiple communication technologies enabled in a terminal.
Figure 4:
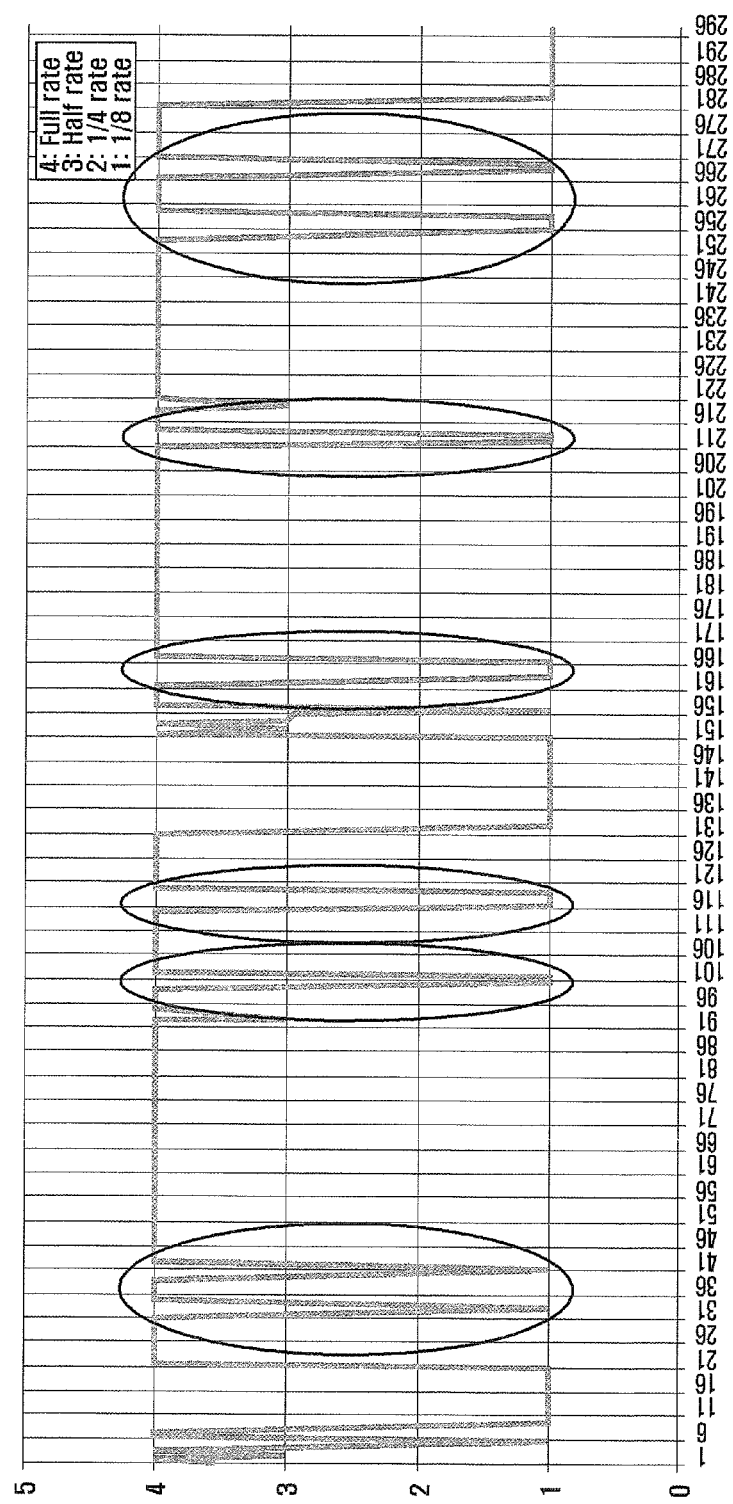
FIGS. 4 and 5 illustrate voice activity state variations during human speech.
Figure 5:
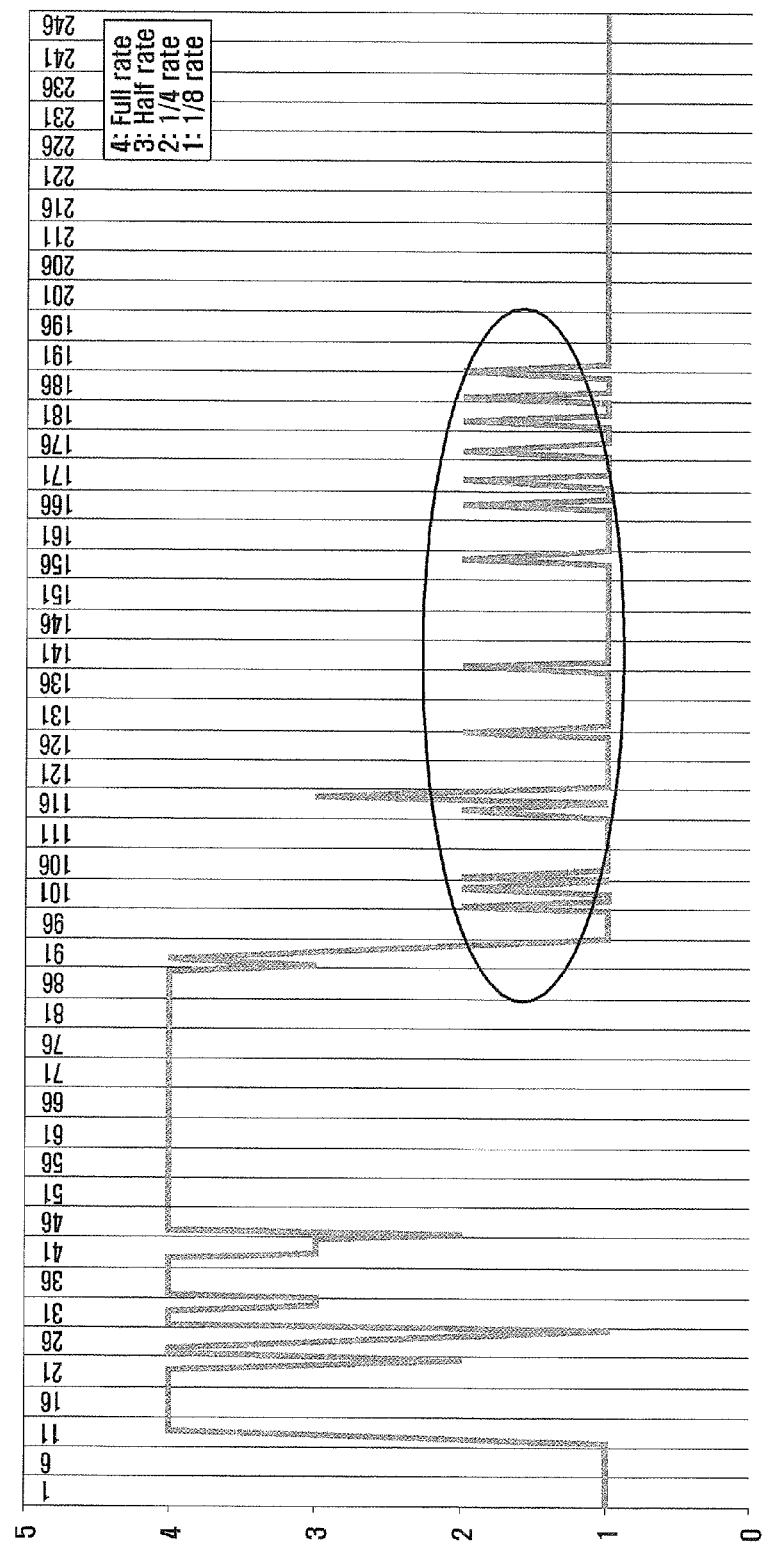
Figure 6:
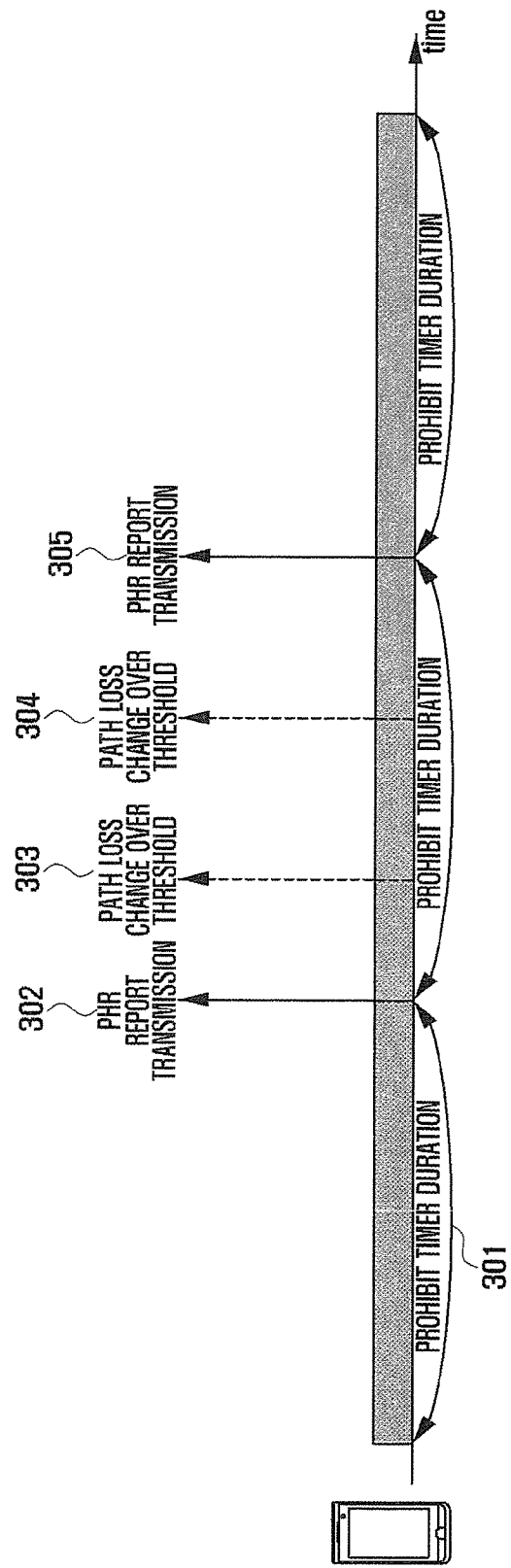
FIG. 6 illustrates a principle of managing a power headroom report prohibit timer in the LTE system to which the present disclosure is applied.

FIG. 6 is a diagram illustrating a principle of managing power headroom report prohibit timer in the LTE system to which the present disclosure is applied. In FIG. 6, the x axis denotes time for defining the length of the power headroom report prohibit timer. The UE transmits the Power Headroom Report (PHR) at the time point 302. Afterward, the path loss greater than a threshold value is detected at time point 303. However, if the duration of prohibit timer 301 has not elapsed after the PHR transmission at the time point 302, the UE does not transmit a new PHR. Likewise, even though the PHR triggering event based on the path loss occurs at time point 304, it is ignored. If the path loss is still greater than the threshold value at the time point 305 when the prohibit timer started at the previous PHR transmission time point 302 expires, the UE transmits a new PHR.

Figure 7:
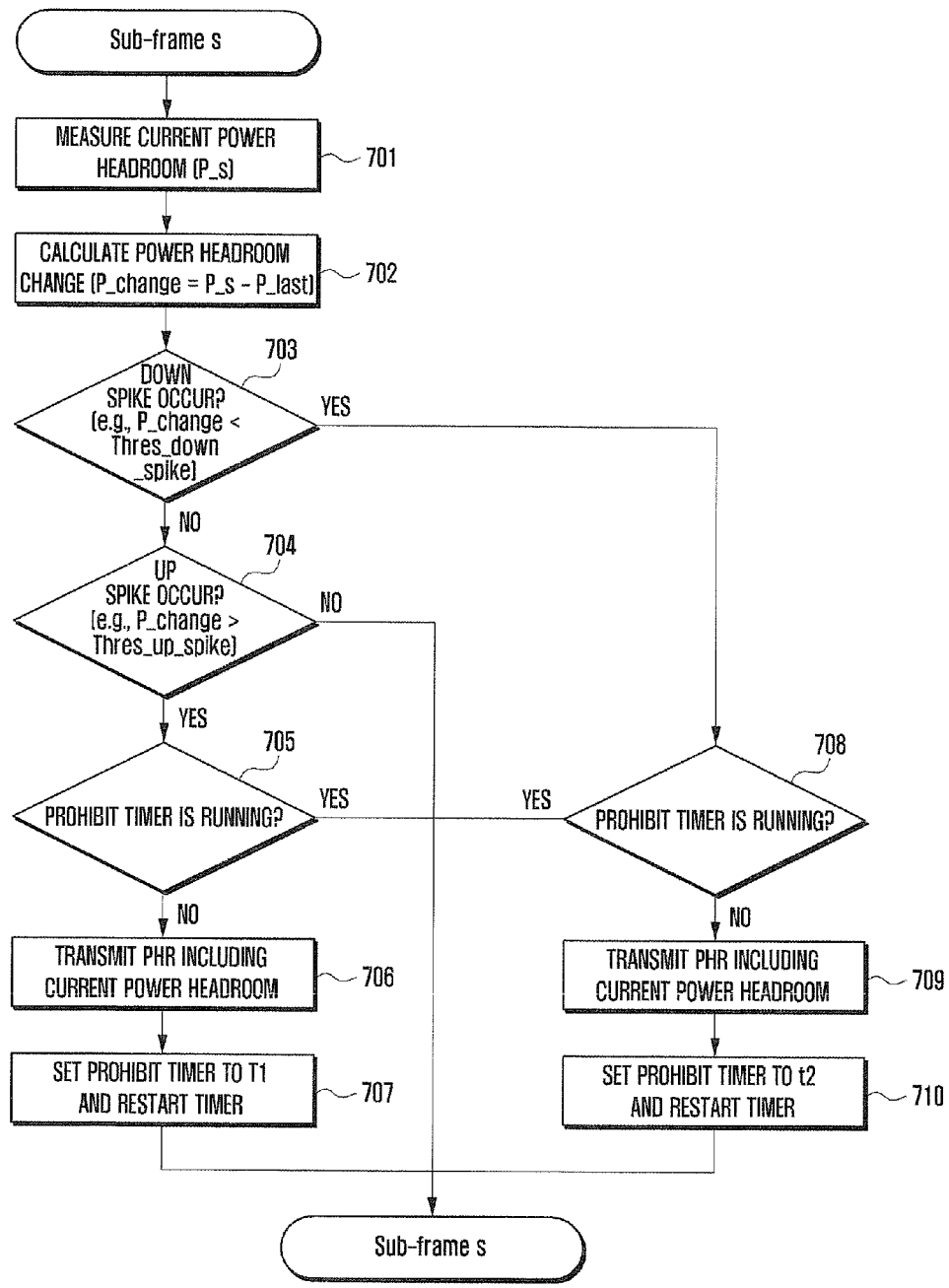
FIG. 7 illustrates a PHR method of the UE according to an embodiment of the present disclosure.

FIG. 7 is a flowchart illustrating a PHR method of the UE according to an embodiment of the present disclosure. In this embodiment, the description is directed to the UE operation in every subframe s.

Referring to FIG. 7, the UE measures power headroom (P_s) for a target technology with the exception of the power allocated for another radio communication technology (block 701). The target technology power headroom can be calculated using the data rate of the other radio communication technology or the value obtained by subtracting the power allocated for the other radio communication technology from the maximum allowed power of the UE.

Next, the UE calculates the change amount (P_change) between the power headroom at the previous PHR time point and the power headroom at the current time point (block 702). The UE determines whether a down spike of the power headroom has taken place based on the calculated power headroom change amount (block 703). The occurrence of a down spike can be judged by determining whether the power headroom change amount calculated at block 702 is less than a predetermined threshold or whether the change amount of the power headroom for the other radio communication technology is equal to or greater than a predetermined threshold value or whether the data rate for the other radio communication technology has increased over a predetermined threshold amount.

If it is determined that a down spike has taken place at block 703, the UE determines whether a PHR prohibit timer is running (block 708). If the PHR prohibit timer is running, the UE terminates PHR operation in the current subframe. Otherwise if no PHR prohibit timer is running, the UE transmits PHR with the current power headroom value (block 709). Next, the UE resets the PHR prohibit timer to a value of t2 and restarts the PHR prohibit timer (block 710) and terminates the PHR procedure in the current subframe.

If it is determined that no down spike has taken place at block 703, the UE determines whether an up spike of headroom power has taken place by checking the calculated power headroom change amount (block 704). The occurrence of an up spike can be judged by determining whether the power headroom change amount calculated at block 702 is greater than a predetermined threshold or whether the change amount of the power headroom for the other radio communication technology is equal to or greater than a predetermined threshold value or whether the data rate for the other radio communication technology decreases over a predetermined threshold value.

If it is determined that an up spike has taken place at block 704, the UE determines whether a PHR prohibit timer is running (block 705). If the PHR prohibit timer is running, the UE terminates PHR operation in the current subframe. Otherwise, if no PHR prohibit timer is running, the UE transmits PHR with the current power headroom value (block 706). Next, the UE sets the PHR prohibit timer to a value of t1 and restarts the PHR prohibit timer (block 707) and terminates the PHR procedure in the current subframe.

If it is determined that no up spike has taken place at block 704, the UE terminates the PHR report operation in the current subframe.

Here, the prohibit timer values t1 and t2 differ from each other, and t2 set with the occurrence of a down spike can be greater than t1 set with the occurrence of an up spike. Oppositely, t2 set with the occurrence of a down spike can be less than t1 set with the occurrence of an up spike.

Figure 8:
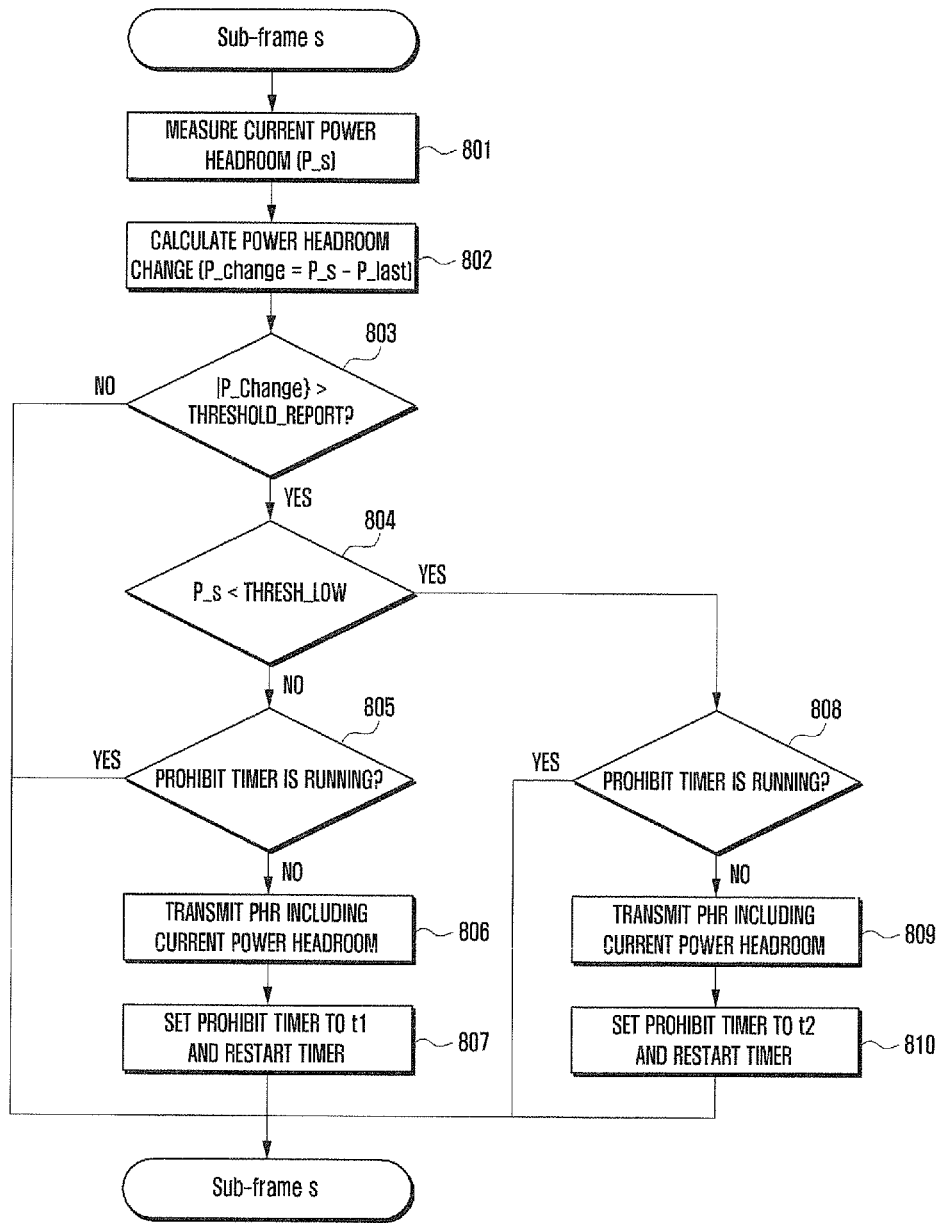
FIG. 8 illustrates a PHR method of the UE according to another embodiment of the present disclosure.

FIG. 8 is a flowchart illustrating a PHR method of a UE according to another embodiment of the present disclosure. In the embodiment, the description is directed to the UE operation in every subframe s. In this embodiment, if the power headroom changes abruptly, the UE determines whether a current power headroom is less than a predetermined threshold value and sets the PHR prohibit timer depending on the determination result.

Referring to FIG. 8, the UE measures power headroom (P_s) for a target technology with the exception of the power allocated for another radio communication technology (block 801). The target technology power headroom can be calculated using the data rate of the other radio communication technology or the value obtained by subtracting the power allocated for the other radio communication technology from the maximum allowed power of the UE.

Next, the UE calculates the change amount (P_change) between the power headroom at the previous PHR time point and the power headroom at the current time point (block 802). Next, the UE determines whether there is an abrupt power headroom change, i.e. whether the power headroom change amount calculated at block 802 is greater than a threshold value (block 803). The abrupt power headroom change can be judged by determining whether the absolute value of the power headroom change amount calculated at block 802 is greater than a predetermined threshold value or whether the change amount of the power headroom for the other radio communication technology is equal to or greater than a predetermined threshold value or whether the data rate for the other radio communication technology has increased or decreased over a predetermined threshold amount.

If it is determined that an abrupt power headroom change has taken placed at block 803, the UE determines whether the power headroom (P_s) measured at block 801 is less than a predetermined threshold value (block 804). The determination at block 804 can be made based on whether the transmission power used for the other radio communication technology is greater than a predetermined threshold value or whether the data rate used for the other radio communication technology is greater than a predetermined threshold value.

If it is determined that the power headroom (P_s) is less than the threshold value at block 804, the UE determines whether the PHR prohibit timer is running (block 808). If it is determined that the PHR prohibit timer is not running, the UE transmits PHR including the current power headroom (block 809). Next, the UE restarts the PHR prohibit timer reset to the value t2 (block 810) and terminates the power headroom report operation.

Otherwise, if it is determined that the power headroom (P_s) is equal to or greater than the threshold value at block 804, the UE determines whether the PHR prohibit timer is running (block 805). If it is determined that the PHR prohibit timer is running, the UE terminates the power headroom report operation. Otherwise, if the PHR prohibit timer is not running at block 805, the UE transmits PHR including the current power headroom (block 806). Next, the UE starts the PHR prohibit timer set to the value t1 (block 807) and terminates the PHR procedure.

The PHR prohibit timer values t1 and t2 may be different from each other and t2 can be greater than or less than t1.

Figure 9:
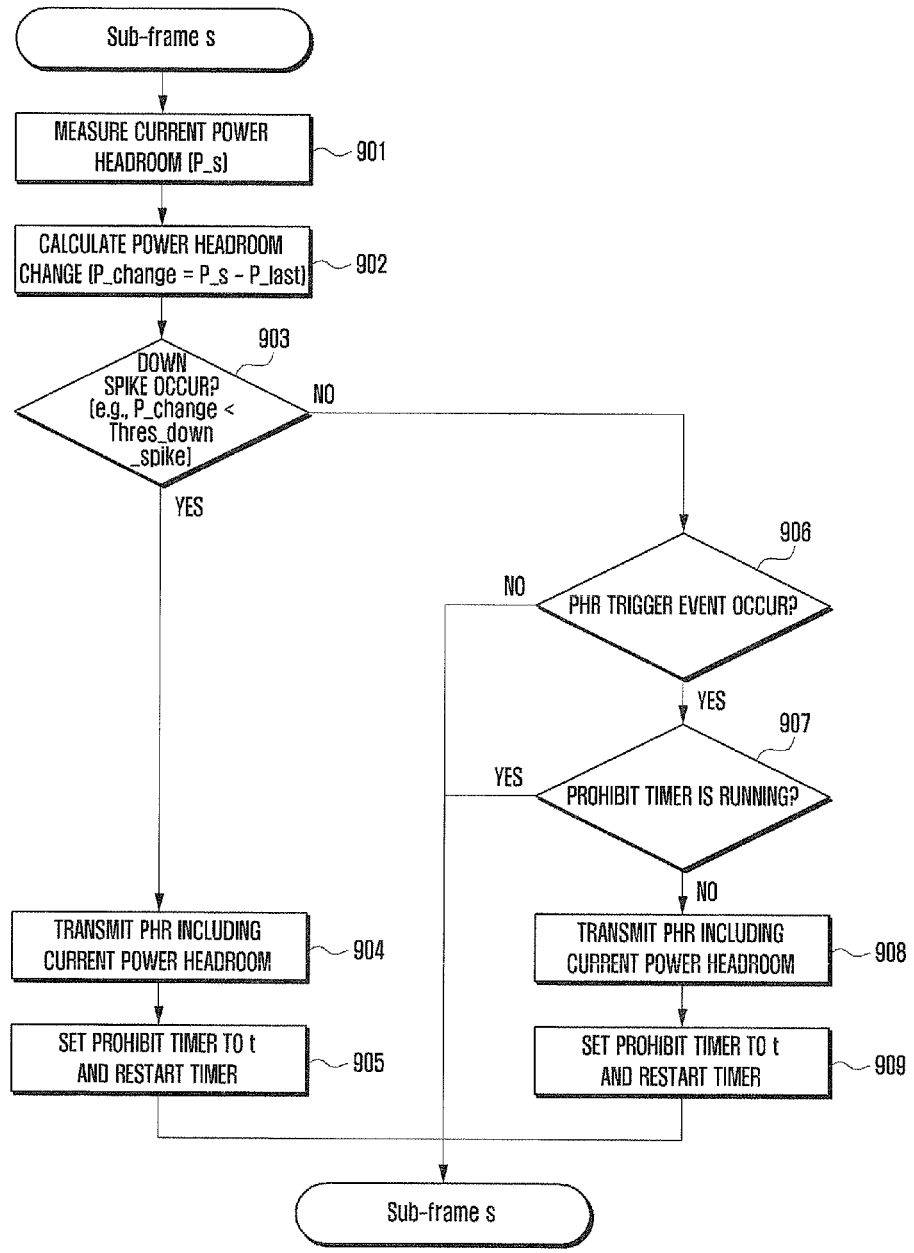
FIG. 9 illustrates a PHR method of the UE according to a further embodiment of the present disclosure.

FIG. 9 is a flowchart illustrating a PHR method of the UE according to a further embodiment of the present disclosure. In this embodiment, the description is directed to the UE operation in every subframe s. In this embodiment, if a down spike is detected, the UE transmits PHR regardless of whether the PHR prohibit timer is running and then resets the PHR prohibit timer. In this embodiment, if a normal PHR trigger event occurs, the UE transmits PHR only when the PHR prohibit timer is not running and then resets the PHR prohibit timer.

Referring to FIG. 9, the UE measures power headroom (P_s) for a target technology with the exception of the power allocated for another radio communication technology (block 901). The target technology power headroom can be calculated using the data rate of the other radio communication technology or the value obtained by subtracting the power allocated for the other radio communication technology from the maximum allowed power of the UE.

Next, the UE calculates the change amount (P_change) between the power headroom at the previous PHR time point and the power headroom at the current time point (block 902). The UE determines whether a down spike of the power headroom has taken place based on the calculated power headroom change amount (block 903). The occurrence of a down spike can be judged by determining whether the power headroom change amount calculated at block 902 is less than a predetermined threshold or whether the change amount of the power headroom for the other radio communication technology is equal to or greater than a predetermined threshold value or whether the data rate for the other radio communication technology has increased over a predetermined threshold amount.

If it is determined that a down spike has taken place at block 903, the UE transmits PHR including the current power headroom regardless of whether the PHR prohibit timer is running (block 904). Next, the UE restarts the PHR prohibit timer set to the value t (block 905) and terminates the PHR procedure in the current subframe.

Otherwise, if it is determined that no down spike has taken place at block 903, the UE determines whether a PHR trigger event has taken place (block 906). If no PHR trigger event has taken place at block 906, the UE terminates the PHR procedure in the current subframe.

If a PHR trigger event has taken place at block 906, the UE determines whether the PHR prohibit timer is running (block 907). If the PHR prohibit timer is running, the UE terminates the PHR procedure. Otherwise, if a PHR prohibit timer is not running, the UE transmits the PHR including current power headroom (block 908). Next, the UE restarts the PHR prohibit timer set to the value t (block 909) and terminates the PHR procedure in the current subframe.

Figure 10:
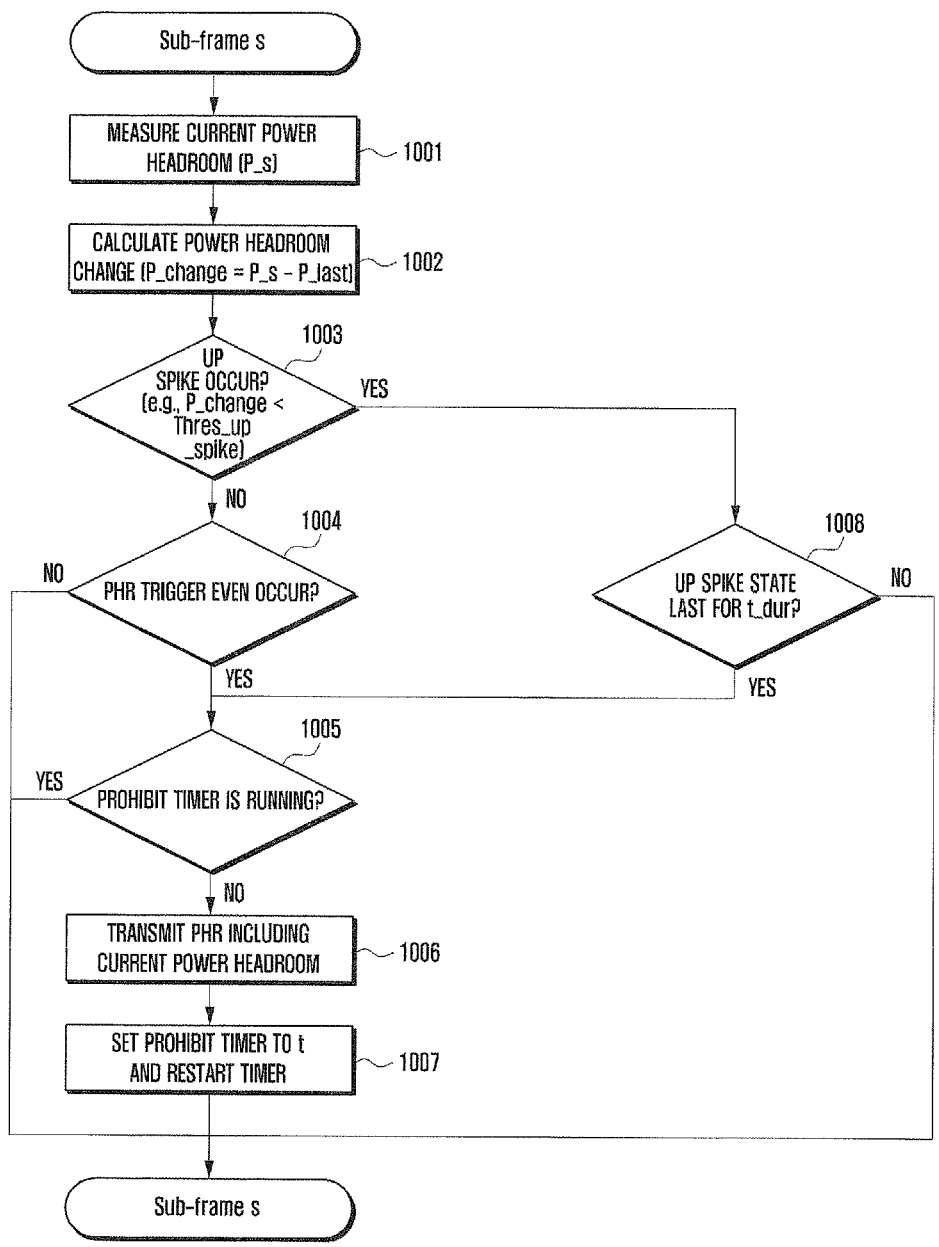
FIG. 10 illustrates a PHR method of the UE according to yet another embodiment of the present disclosure.

FIG. 10 is a flowchart illustrating a PHR method of a UE according to yet another embodiment of the present disclosure. In this embodiment, the description is directed to the UE operation in every subframe s. In this embodiment, although an up spike or a down spike is detected, the UE transmits PHR only when the up or down spike continues over a predetermined time duration. According to another embodiment of the present disclosure, the UE can be configured so as, if an up spike or a down spike is detected, to transmit PHR regardless of the time duration for which the up or down spike continues.

Referring to FIG. 10, the UE measures power headroom (P_s) for a target technology with the exception of the power allocated for another radio communication technology (block 1001). The power headroom can be calculated using the data rate of the other radio communication technology or the value obtained by subtracting the power allocated for the other radio communication technology from the maximum allowed power of the UE.

Next, the UE calculates the change amount (P_change) between the power headroom at the previous PHR time point and the power headroom at the current time point (block 1002). The UE determines whether an up spike of the power headroom has taken place based on the calculated power headroom change amount (block 1003). The occurrence of an up spike can be judged by determining whether the power headroom change amount calculated at block 1002 is greater than a predetermined threshold or whether the change amount of the power headroom for the other radio communication technology is equal to or less than a predetermined threshold value or whether the data rate for the other radio communication technology has decreased over a predetermined threshold amount.

If it is determined that the up spike has taken place at block 1003, the UE determines whether the up spike has continued over a predetermined time duration (t_dur) (block 1008). The time duration value can be notified to the UE by the eNB in unicast transmission or in the system information broadcast. Also, the time duration value can be a constant value agreed between the eNB and UE.

If it is determined that the up spike has not continued over the time duration at block 1008, the UE terminates the PHR procedure. Otherwise, if it is determined that the up spike has continued over the time duration, the UE determines whether the PHR prohibit timer is running (block 1005). If the PHR prohibit timer is running, the UE terminates the PHR procedure. Otherwise, if the PHR prohibit time is not running, the UE transmits PHR including current power headroom (block 1006). Next, the UE restarts the PHR prohibit timer set to t (block 1007) and terminates the PHR procedure.

If it is determined that the no up spike has taken place at block 1003, the UE determines whether a PHR trigger event has taken place (block 1004). If no PHR trigger event has taken place at block 1004, the UE terminates the PHR procedure.

Otherwise, if a PHR trigger event has taken at block 1004, the UE determines whether the PHR prohibit timer is running (block 1005). If the PHR prohibit timer is running, the UE terminates the PHR procedure. Otherwise, if the PHR prohibit timer is not running, the UE transmits PHR including the current power headroom (block 1006). Next, the UE restarts the PHR prohibit timer set to t (block 1007) and terminates the PHR procedure.

Although the description is directed to a situation where, when the power headroom has changed abruptly, the UE determines whether the PHR prohibit timer is running in the above embodiments, the present disclosure is not limited thereto.

According to another embodiment of the present disclosure, the UE measures the power headroom (P_s) for the target system with the exception of the power allocated for another radio communication technology. The power headroom for the target system can be calculated using the data rate of the other radio communication technology or the value obtained by subtracting the power allocated for the other radio communication technology from the maximum allowed power of the UE. Next, the UE determines where the power headroom has changed abruptly as compared to that measured at the time point of previous PHR. The abrupt power headroom change can be judged by determining whether the absolute value of the power headroom change amount calculated at block 1002 is greater than a predetermined threshold value or whether the change amount of the power headroom for the other radio communication technology is equal to or greater than a predetermined threshold value or whether the data rate for the other radio communication technology has increased or decreased over a predetermined threshold amount.

If it is determined that the power headroom has changed abruptly, the UE terminates the PHR procedure. Otherwise, if it is determined that the power headroom has not changed abruptly, the UE transmits PHR including the current power headroom. The UE can set the PHR prohibit timer to a value of t optionally. Afterward, the UE restarts the PHR prohibit timer and terminates the PHR procedure in the current subframe.

Figure 11:
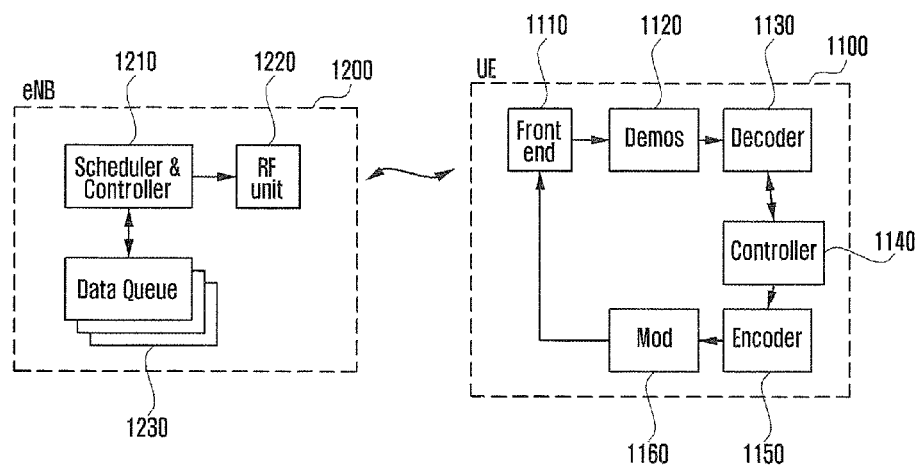
FIG. 11 illustrates a system for a UE to report per-technology power headroom to an eNB according to an embodiment of the present disclosure.

FIG. 11 is a block diagram illustrating a system for a UE to report per-technology power headroom to an eNB according to an embodiment of the present disclosure.

Referring to FIG. 11, the UE 1100 configured to report the power headroom of a target system according to an embodiment of the present disclosure includes a transceiver (front end) 1110, a demodulator (Demod) 1120, a decoder 1130, a controller 1140, an encoder 1150, and a modulator (Mod) 1160.

The controller 1140 of the UE 1100 calculates the power headroom for a target system and starts a PHR prohibit timer set to a value that is set differently depending on whether the power headroom has increased or decreased according to an embodiment of the present disclosure. If the power headroom has decreased, the controller 1140 sets the PHR prohibit timer to a value greater than that set for a situation associated with a power headroom increase. If the power headroom has decreased, the controller 1140 transmits the power headroom report and then resets the PHR prohibit timer regardless of the running of the PHR prohibit timer. If an up spike of the power headroom takes place, the controller 1140 transmits PHR only when the up spike continues over a predetermined timer duration.

The UE 1100 encodes the power headroom generated from the controller 1140 by means of the encoder 1150, modulates the encoding signal by means of the modulator 1160, and transmits the modulated signal by means of the transceiver 1110.

According to another embodiment of the present disclosure, the controller 1140 measures current power headroom, compares the current power headroom with the previous power headroom measured at a time point before a predetermined time from the current time point to check on whether the power headroom has increased or decreased (i.e. detects power headroom change), and determines whether to report the current power headroom according to the duration of the power headroom change. If the power headroom change duration is shorter than a threshold length, the controller 1140 controls the transceiver 1110 to suspend reporting the current power headroom. Otherwise, if the power headroom change duration is longer than the threshold length, the controller 1140 controls the transceiver 1110 to report the current power headroom.

The controller 1140 also determines whether a predetermined time duration of the PHR prohibit timer has expired and controls, if the timer has expired, to report the current power headroom and initialize the PHR prohibit timer with a different value.

The controller 1140 is provided with a calculation unit and a determination unit. The calculation unit calculates the power headroom change from a previous measurement time point to the current time point. The determination unit determines whether a predetermined time duration of the PHR prohibit timer has expired.

If the power headroom change amount is greater than a predetermined threshold value, the determination unit can determine whether the PHR prohibit timer has expired. If the PHR prohibit timer has expired, the controller 1140 can report the current power headroom to the corresponding system. The controller 1140 can reset the PHR prohibit timer to a different value. Here, the value of the PHR prohibit timer can be determined differently depending on whether the current power headroom has increased or decreased as compared to the old power headroom measured previously. The value of the PHR prohibit timer also can be determined differently depending on whether the current power headroom is greater or less than a predetermined threshold value.

If the PHR prohibit timer has expired, the calculation unit can calculate the power headroom change amount. If the power headroom change amount is equal to or less than a threshold value, the controller 1140 can report the current power headroom to the corresponding system. The controller 1140 can reset the PHR prohibit timer to a different value.

The eNB 1200 is configured to control the PHR and allocate power headroom information to UEs according to the PHR method described by the present disclosure. The eNB 1200 includes a scheduler & controller 1210, a Radio Frequency (RF) unit 1220, and a data queue 1230.

The controller 1210 of the eNB 1200 configures a plurality of parameters for controlling PHR in the call setup or release process of the UE or in the negotiation on the parameters related to radio access between the eNB 1200 and UE 1100, or broadcasts the parameters such that all of the UEs can receive the parameters within the service area of the eNB 1200. The data queue 1230 of the eNB 1200 is activated per UE or service to save the data from higher network nodes. The scheduler & controller 1210 perform scheduling/controlling on the data per user or queue in consideration of the power headroom reported by the UEs. The RF unit 1220 transmits the data and control signals to the UE 1100 as scheduled (or controller selectively).

As described above, the power headroom report method and apparatus of the present disclosure is capable of controlling power headroom reporting efficiently per radio communication technology in a terminal that supports multiple radio communication technologies even when the power headroom for the corresponding radio communication technology varies frequently.

Also, the power headroom report method and apparatus of the present disclosure is capable of controlling power headroom reporting efficiently by applying different report schemes depending on whether the power headroom for the corresponding system increases or decreases.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to report power headroom of a terminal supporting a plurality of radio communication systems, comprising:
   measuring a current power headroom for one of the plurality of radio communication systems;
   detecting a change of a power headroom between the current power headroom and a previously measured power headroom; and
   determining whether to report the current power headroom based on a time duration that the power headroom continues to change.

2. The method of claim 1, wherein determining comprises determining, if the time duration that the power headroom continues to change is equal to or shorter than of a predetermined time, whether to suspend a reporting of the current power headroom.

3. The method of claim 1, wherein determining comprises determining, if the time duration that the power headroom continues to change is longer than a predetermined time, whether to report the current power headroom.

4. The method of claim 1, wherein the change in the power headroom comprises an increase in the power headroom compared to the previous power headroom.

5. The method of claim 1, wherein the change in the power headroom comprises a decrease in the power headroom compared to the previous power headroom.

6. The method of claim 1, further comprising:
   determining whether a report prohibit timer set to a predetermined value has expired; and
   reporting, if the report prohibit timer has expired, the current power headroom.

7. The method of claim 6, further comprising resetting the report prohibit timer to a different value.

8. An apparatus to report power headroom of a terminal supporting a plurality of radio communication systems, the apparatus comprising:
   a transceiver configured to transmit a current power headroom corresponding to a system among the plurality of radio communication systems; and
   a controller configured to measure the current power headroom for one of the plurality of radio communication systems, detect a change of a power headroom between the current power headroom and a previously measured power headroom, and determine whether to report the current power headroom based on a time duration that the power headroom continues to change.

9. The apparatus of claim 8, wherein the controller is configured to determine, if the time duration that the power headroom continues to change is equal to or shorter than a predetermined time, whether to suspend reporting the current power headroom.

10. The apparatus of claim 8, wherein the controller is configured to determine, if the time duration that the power headroom continues to change is longer than a predetermined time, whether to report the current power headroom.

11. The apparatus of claim 8, wherein the change in the power headroom comprises an increase in the power headroom compared to the previous power headroom.

12. The apparatus of claim 8, wherein the change in the power headroom comprises a decrease in the power headroom compared to the previous power headroom.

13. The apparatus of claim 8, wherein the controller is configured to determine whether a report prohibit timer set to a predetermined value has expired and report, if the report prohibit timer has expired, the current power headroom.

14. The apparatus of claim 13, wherein the controller is configured to reset the report prohibit timer to a different value.

15. A terminal configured to support a plurality of radio communication systems, the terminal comprising:
   a transceiver configured to transmit a current power headroom corresponding to a system among the plurality of multiple radio communication systems;
   an encoder configured to encode the current power headroom for one of the plurality of radio communication systems; and
   a controller configured to measure the current power headroom for one of the plurality of radio communication systems, detect a change of a power headroom between the current power headroom and a previously measured power headroom, and determine whether to report the current power headroom based on a time duration that the power headroom continues to change.

16. The terminal of claim 15, wherein the controller is configured to determine, if the time duration that the power headroom continues to change is equal to or shorter than a predetermined time, whether to suspend a reporting of the current power headroom.

17. The terminal of claim 15, wherein the controller is configured to determine, if the time duration that the power headroom continues to change is longer than a predetermined time, whether to report the current power headroom.

18. The terminal of claim 15, wherein the change in the power headroom comprises an increase in the power headroom compared to the previous power headroom.

19. The terminal of claim 15, wherein the change in the power headroom comprises a decrease in the power headroom compared to the previous power headroom.

20. The terminal of claim 15, wherein the controller is configured to determine whether a report prohibit timer set to a predetermined value has expired and report, if the report prohibit timer has expired, the current power headroom.

\* \* \* \* \*